United States Patent
Oryoji et al.

(10) Patent No.: US 10,837,418 B2
(45) Date of Patent: Nov. 17, 2020

(54) INTERNAL COMBUSTION ENGINE CONTROL DEVICE

(71) Applicant: Hitachi Automotive Systems, Ltd., Hitachinaka (JP)

(72) Inventors: Kazuhiro Oryoji, Tokyo (JP); Masayuki Saruwatari, Hitachinaka (JP); Yoshihiro Sukegawa, Tokyo (JP)

(73) Assignee: Hitachi Automotive Systems, Ltd., Hitachinaka (JP)

( * ) Notice: Subject to any disclaimer, the term of this patent is extended or adjusted under 35 U.S.C. 154(b) by 78 days.

(21) Appl. No.: 15/763,808

(22) PCT Filed: Aug. 2, 2016

(86) PCT No.: PCT/JP2016/072579
§ 371 (c)(1),
(2) Date: Mar. 27, 2018

(87) PCT Pub. No.: WO2017/056687
PCT Pub. Date: Apr. 6, 2017

(65) Prior Publication Data
US 2019/0048842 A1 Feb. 14, 2019

(30) Foreign Application Priority Data
Sep. 30, 2015 (JP) ................... 2015-192527

(51) Int. Cl.
*F02P 5/04* (2006.01)
*F02D 15/02* (2006.01)
(Continued)

(52) U.S. Cl.
CPC .......... *F02P 5/045* (2013.01); *F02B 29/0493* (2013.01); *F02D 15/02* (2013.01);
(Continued)

(58) Field of Classification Search
CPC .. F02P 5/045; F02P 5/15; F02P 5/1502; F02P 5/1516; F02B 29/0493; F02B 75/04;
(Continued)

(56) References Cited

U.S. PATENT DOCUMENTS 6,230,683 B1 * 5/2001 zur Loye .................. F02B 1/12
123/27 GE
6,276,334 B1 * 8/2001 Flynn ...................... F02B 19/14
123/435
(Continued)

FOREIGN PATENT DOCUMENTS

| CN | 1620547 A | 5/2005 |
|---|---|---|
| CN | 1735744 A | 2/2006 |

(Continued)

OTHER PUBLICATIONS

Extended European Search Report issued in counterpart European Application No. 16850864.6 dated May 6, 2019 with English translation (seven (7) pages).
(Continued)

*Primary Examiner* — Hung Q Nguyen
*Assistant Examiner* — Susan E Scharpf
(74) *Attorney, Agent, or Firm* — Crowell & Moring LLP

(57) ABSTRACT

The invention provides an internal combustion engine control device capable of performing a stable combustion at a lean combustion limit. In an internal combustion engine control device that controls an internal combustion engine provided with an ignition device igniting an air-fuel mixture formed inside a combustion chamber, an intake side air temperature of the internal combustion engine is controlled in response to a compression ratio of the combustion chamber.

4 Claims, 13 Drawing Sheets

(51) Int. Cl.

| | |
|---|---|
| *F02P 5/15* | (2006.01) |
| *F02D 37/02* | (2006.01) |
| *F02B 29/04* | (2006.01) |
| *F02D 41/00* | (2006.01) |
| *F02D 41/40* | (2006.01) |
| *F02B 75/04* | (2006.01) |
| *F02D 41/38* | (2006.01) |

(52) U.S. Cl.
CPC ......... *F02D 37/02* (2013.01); *F02D 41/0002* (2013.01); *F02D 41/401* (2013.01); *F02P 5/15* (2013.01); *F02P 5/1502* (2013.01); *F02B 75/04* (2013.01); *F02D 2041/389* (2013.01); *F02D 2200/024* (2013.01); *F02D 2200/0414* (2013.01); *Y02T 10/12* (2013.01)

(58) Field of Classification Search
CPC ........ F02D 37/02; F02D 15/02; F02D 41/401; F02D 41/0002; F02D 2200/0414; F02D 2200/024; F02D 2041/389; Y02T 10/146; F02M 26/33; F02M 26/06
See application file for complete search history.

(56) References Cited

U.S. PATENT DOCUMENTS

| | | | |
|---|---|---|---|
| 9,074,525 B2 | 7/2015 | Pendray | |
| 2003/0230276 A1 | 12/2003 | Kataoka et al. | |
| 2005/0022755 A1 | 2/2005 | Hitomi et al. | |
| 2006/0169246 A1* | 8/2006 | Asai | F01L 13/0042 |
| | | | 123/305 |
| 2008/0210196 A1* | 9/2008 | Ashizawa | F02D 13/0203 |
| | | | 123/305 |
| 2010/0042308 A1 | 2/2010 | Kobayashi et al. | |
| 2012/0111302 A1 | 5/2012 | Shishime et al. | |
| 2012/0271533 A1* | 10/2012 | Shishime | F02D 35/021 |
| | | | 701/105 |
| 2013/0174811 A1 | 7/2013 | Nishimura et al. | |
| 2014/0076280 A1 | 3/2014 | Kondo et al. | |

FOREIGN PATENT DOCUMENTS

| | | |
|---|---|---|
| CN | 101506502 A | 8/2009 |
| CN | 102465782 A | 5/2012 |
| CN | 102959226 A | 3/2013 |
| EP | 1 519 019 A1 | 3/2005 |
| EP | 1 586 757 A1 | 10/2005 |
| EP | 2 357 345 A2 | 8/2011 |
| JP | 2003-343313 A | 12/2003 |
| JP | 2005-140054 A | 6/2005 |
| JP | 2009-13922 A | 1/2009 |
| JP | 2014-62466 A | 4/2014 |
| JP | 2015-31192 A | 2/2015 |

OTHER PUBLICATIONS

Chinese-language Office Action issued in counterpart Chinese Application No. 201680054215.9 dated Jul. 18, 2019 with partial English translation (eight (8) pages).
Japanese-language International Search Report (PCT/ISA/210) issued in PCT Application No. PCT/JP2016/072579 with English translation dated Nov. 22, 2016 (three (3) pages).
Japanese-language Written Opinion (PCT/ISA/237) issued in PCT Application No. PCT/JP2016/072579 dated Nov. 22, 2016 (four (4) pages).

* cited by examiner

INTERNAL COMBUSTION ENGINE CONTROL DEVICE

TECHNICAL FIELD

The present invention relates to an engine control device, and particularly, to a technology of controlling an engine performing lean combustion used to reduce fuel consumption of the engine.

BACKGROUND ART

Usually in internal combustion engines of gasoline vehicles, an air-fuel mixture is burned at an approximately theoretical mixing ratio to extract power. At that theoretical mixing ratio, the purification rates of unburned hydrocarbon (HC), nitrogen oxide (NOx), and carbon monoxide (CO) can be also increased by a three-way catalyst attached to an exhaust side of the engine. On the contrary, there is known a so-called lean combustion (lean burn) in which fuel and air are burned in a condition (an air excess/lean condition) having a large air ratio compared to the theoretical mixing ratio. Since the lean combustion can reduce the intake loss (pumping loss) or the cooling loss of the engine, the lean combustion has been developed for years as a fuel-efficient technology for automobiles. One problem in the lean combustion condition is that NOx is not purified by the three-way catalyst since oxygen remains in an exhaust gas. For this reason, there is a need to reduce NOx generated during combustion. One method is to increase the air ratio (the excess air ratio).

PTL 1 discloses an example of realizing the lean combustion having a reduced NOx discharge amount. In this known example, it is disclosed that a temperature having a steep laminar combustion speed relative to a temperature is defined as an inflection point temperature and an internal combustion engine control device controls an engine so that an in-cylinder temperature at a compression top dead center is higher than the inflection point temperature for uniform lean combustion.

CITATION LIST

Patent Literature

PTL 1: Japanese Unexamined Patent Application Publication No. 2014-62466

SUMMARY OF INVENTION

Technical Problem

The technology disclosed in PTL 1 is a technology of controlling the temperature at the compression top dead center to become higher than the inflection point temperature. However, the in-cylinder temperature can be set within various ranges in accordance with the operation condition of the engine or the operation state of the actuator. Further, a problem arises in that the in-cylinder temperature cannot reach a target temperature so that combustion is difficult to realize during the operation of the actuator.

Here, an object of the invention is to provide an internal combustion engine control device capable of realizing desired lean combustion in various environment conditions.

Solution to Problem

In order to solve the above issue, the present invention provides an internal combustion engine control device which controls an internal combustion engine provided with a fuel injection device directly injecting fuel into a combustion chamber and an ignition device igniting an air-fuel mixture formed inside the combustion chamber, and the internal combustion engine control device includes a temperature control unit which controls an intake side air temperature of the internal combustion engine in response to a compression ratio of the combustion chamber.

Advantageous Effects of Invention

According to the invention, it is possible to provide an internal combustion engine control device capable of realizing desired lean combustion in various environment conditions.

DESCRIPTION OF EMBODIMENTS

Hereinafter, an embodiment of the invention will be described with reference to the drawings. First, common configurations of the embodiment illustrated below will be described with reference to FIGS. 1 and 2.

Embodiment 1

Figure 1:
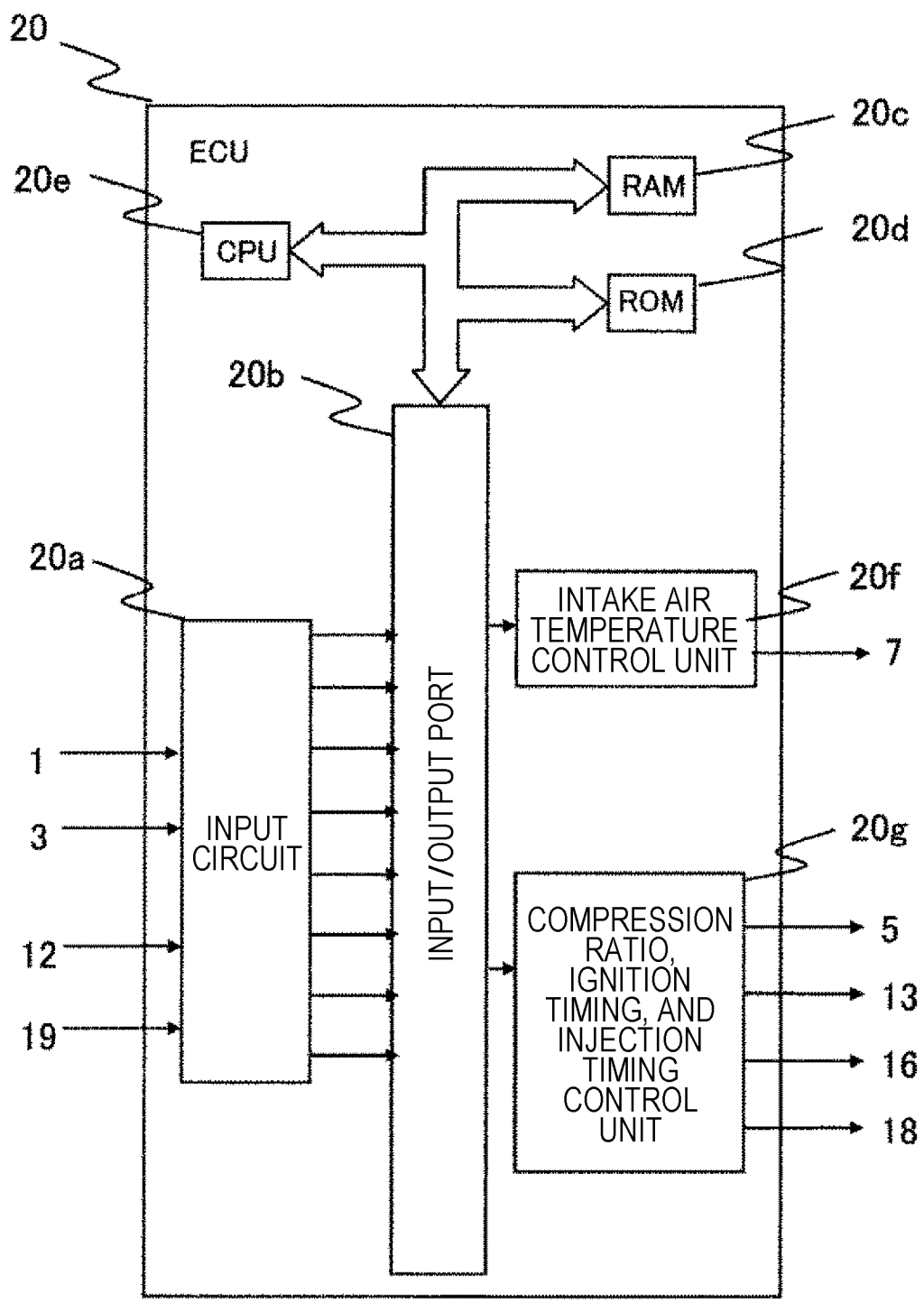
FIG. 1 is a system configuration diagram of an engine control device according to an embodiment of the invention.

FIG. 1 is a system block diagram illustrating a configuration of an engine control device (an ECU 20) according to Embodiment 1 of the invention. Signals output from an air flow sensor 1, an intake air temperature sensor 3, an accelerator opening degree sensor 12, and a crank angle sensor 19 are input to an input circuit 20a of the ECU 20. However, the input signals are not limited thereto. The input signals of the sensors are transmitted to an input port inside an input/output port 20b. A value transmitted to the input port 20b is stored in a RAM 20c and is subjected to a calculation process by a CPU 20e. A control program having calculation process contents is stored in a ROM 20d in advance.

A value which represents each actuator operation amount and is calculated in accordance with the control program is stored in the RAM 20c, is transmitted to an output port inside the input/output port 20b, and is transmitted to each actuator via each drive circuit. The ECU 20 of the embodiment includes an intake air temperature control unit 20f which controls a heat exchange amount of an intake air temperature control device 7 as a drive circuit. Further, the ECU 20 of the embodiment includes an actuator control unit 20g which controls an operation amount or a timing of each of a variable compression ratio mechanism (a variable compression ratio device 18 and a variable valve 5), an ignition coil 16, and a fuel injection device 13 as a drive circuit. The actuator control unit 20g controls a compression ratio obtained by controlling a drive amount of the variable compression ratio mechanism (the variable compression ratio device 18 and the variable valve 5), an ignition timing of the ignition coil 16, and an injection timing or an injection pulse width of the fuel injection device 13. The ignition coil 16 is a transformer which generates a high voltage for discharging with an ignition plug of a spark ignition internal combustion engine and the fuel injection device 13 is an injector which directly injects fuel into a combustion chamber of the spark ignition internal combustion engine. In the embodiment, the drive circuit is provided inside the ECU 20, but the invention is not limited thereto. For example, any one of the drive circuits may be provided inside the ECU 20.

The actuator control unit 20g of the ECU 20 detects an intake air temperature at the time of controlling any one or all of the ignition coil 16, the fuel injection device 13, the variable compression ratio device 18, and the variable valve 5, allows an input power to flow to both the fuel injection device 13 and the ignition coil 16 at an appropriate timing determined based on the detected intake air temperature, and allows an input current to flow to the variable compression ratio device 18 and the variable valve 5 in response to a condition.

Figure 2:
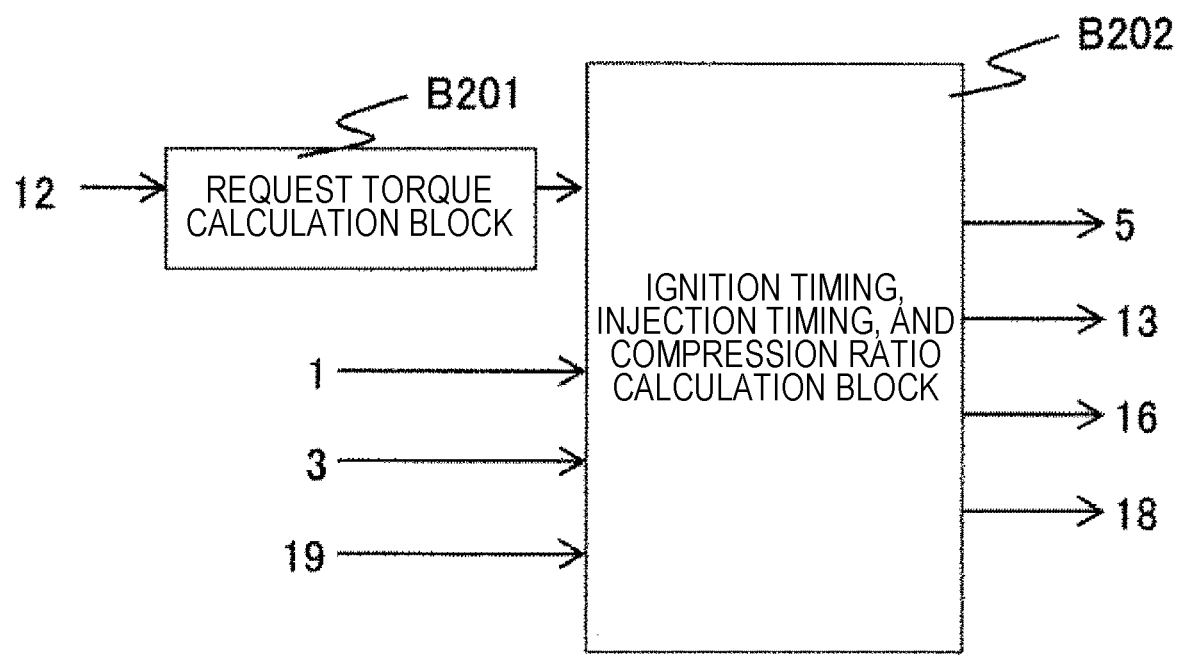
FIG. 2 is a system block diagram illustrating a configuration of the engine control device according to the embodiment of the invention.

FIG. 2 is a diagram illustrating an outline of a control logic for an ignition timing, a fuel injection timing, and a compression ratio executed inside the CPU 20e of the ECU 20 of the engine control device according to the embodiment and the control logic includes a request torque calculation block B201 and an actuator control block B202. The CPU 20e of the ECU 20 determines various actuator control amounts by executing such a control logic. The request torque calculation block B201 calculates a request torque and a request air amount based on the output of the accelerator opening degree sensor 12. The actuator control block B202 controls the ignition timing of the ignition coil 16, the injection timing of the fuel injection device 13, and the compression ratio of the variable compression ratio mechanism (the variable compression ratio device 18 and the variable valve 5) based on a gas temperature in the intake pipe calculated based on the output of the intake air temperature sensor 3 and the engine rotation speed calculated based on the output of the crank angle sensor 19, the output of the accelerator opening degree sensor 12 is input to the request torque calculation block B201, the output of the intake air temperature sensor 3 is input to the actuator control block B202, and the control signals of the ignition coil 16, the fuel injection device 13, the variable compression ratio device 18, and the variable valve 5 are output and input to the actuator control unit 20g. The actuator control unit 20g which receives such control signals outputs a drive current or a drive voltage to the actuators such as the ignition coil 16, the fuel injection device 13, or the variable compression ratio mechanism (the variable compression ratio device 18 and the variable valve 5) to control such actuators.

In general, an NOx discharge amount can be decreased by increasing an excess air ratio. However, since a combustion speed decreases in proportion to an increase in excess air ratio, it is generally difficult to operate the engine when the excess air ratio of the air-fuel mixture formed inside the engine is about 1.5 to 1.7. The excess air ratio at this time is referred to as a lean combustion limit. This is because a laminar combustion speed approaches 0 when the excess air ratio increases from about 1.5 to 1.7 in an ordinary environment. From the examination so far, if the intake air temperature is kept at a certain level in the ignition timing, it is possible to ensure the combustion speed necessary for the operation of the engine without decreasing the laminar combustion speed even when the excess air ratio becomes 2 or more. As a result, since the lean combustion limit can be extended to the excess air ratio of 2.0, there is a possibility of realizing a lean combustion capable of reducing NOx and fuel consumption at the same time.

Figure 3:
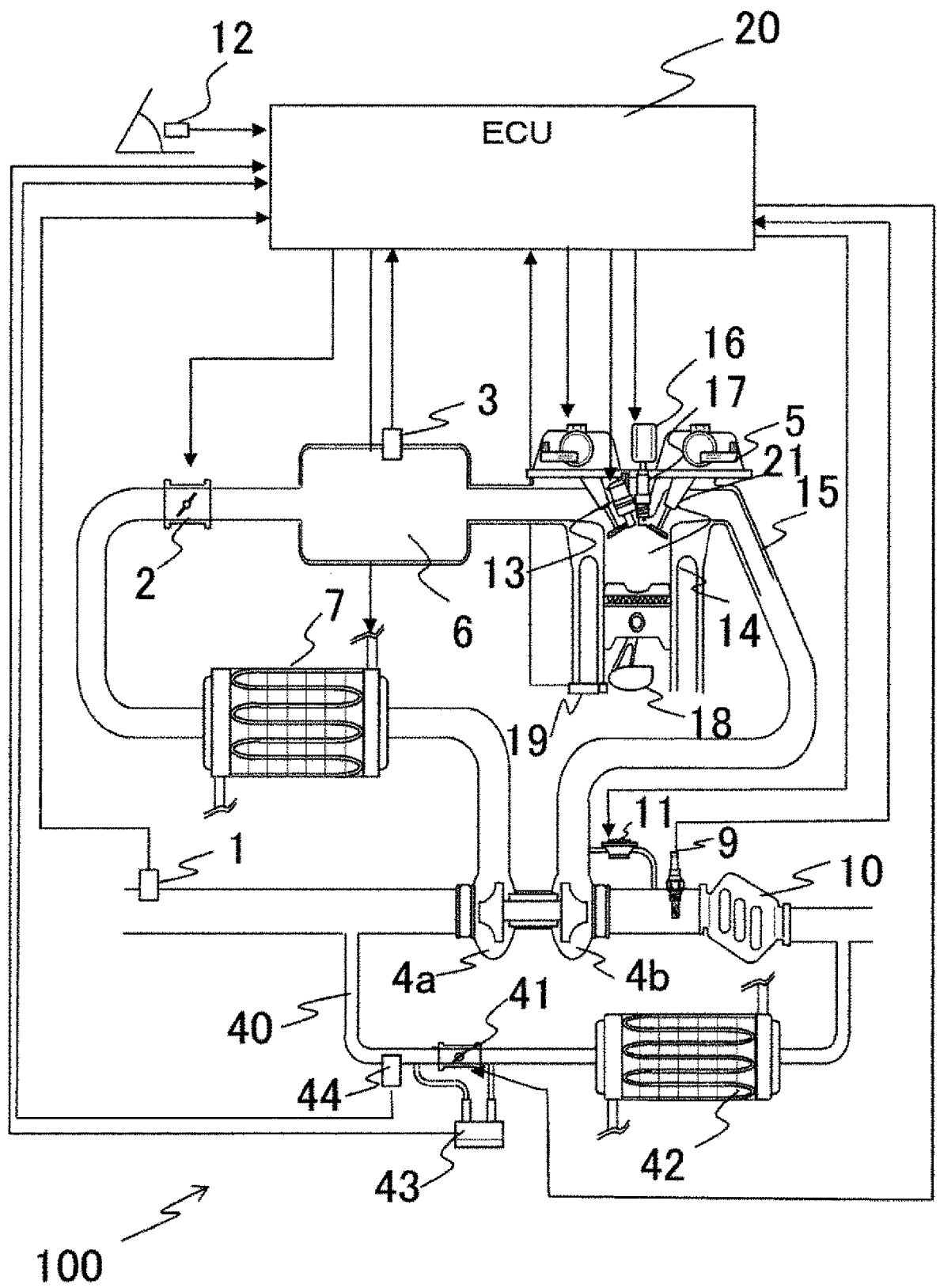
FIG. 3 is a configuration diagram illustrating a configuration of an engine according to the embodiment of the invention.

FIG. 3 is a configuration diagram of an in-cylinder injection type gasoline engine for a vehicle with an intake air temperature control unit 7. An engine 100 is a gasoline engine for a vehicle that performs a spark ignition type combustion. The air flow sensor 1 measuring an intake air amount and a turbine upstream intake air temperature, the intake air temperature sensor 3 provided at an intake manifold 6 in the vicinity of an engine intake valve, a compressor 4a of a supercharger supercharging an intake air, the intake air temperature control device 7 controlling an intake air temperature, and an electronic control throttle 2 adjusting an intake pipe pressure are provided at each appropriate position of the intake pipe. Further, the engine 100 is provided with the fuel injection device (hereinafter, an injector) 13 injecting fuel into each cylinder 14 and the ignition device (hereinafter, the ignition coil 16 and the ignition plug 17) supplying ignition energy for igniting the air-fuel mixture formed inside a combustion chamber 21 for each cylinder. Further, a cylinder head is provided with the variable valve 5 which adjusts a gas flowing into the cylinder or flowing out of the cylinder. When the variable valve 5 is adjusted, the intake amount of all cylinders and the internal EGR amount are adjusted. Although not illustrated in the drawings, a high-pressure fuel pump supplying high-pressure fuel into the fuel injection device 13 is connected to the fuel injection device 13 by a fuel pipe and the fuel pipe is provided with a fuel pressure sensor measuring a fuel injection pressure.

Further, the engine 100 is provided with the variable compression ratio device 18 which controls a reference position of the piston and is equipped with the crank angle sensor 19 which detects the piston position of the engine. An output value of the crank angle sensor 19 is transmitted to the ECU 20. Here, since the variable compression ratio device 18 and the variable valve 5 can control the compression ratio by the operation thereof, these components will also be referred to as a variable compression ratio mechanism below.

Further, a turbine 4b applying a rotational force to the compressor 4a of the supercharger by exhaust energy, an electronic control waste gate valve 11 adjusting a flow rate of an exhaust gas flowing in the turbine, a three-way catalyst 10 purifying an exhaust gas, and an air-fuel ratio sensor 9 corresponding to a kind of air-fuel ratio detector and detecting an air-fuel ratio of an exhaust gas at the upstream side of the three-way catalyst 10 are provided at each appropriate position of an exhaust pipe 15. Although not illustrated in the drawings, a temperature sensor 45 measuring a temperature of cooling water circulated in the engine is provided.

Signals obtained by the air flow sensor 1, the intake air temperature sensor 3, and the air-fuel ratio sensor 9 are transmitted to the engine control unit (the ECU 20). Further, a signal obtained from the accelerator opening degree sensor 12 is transmitted to the ECU 20. The accelerator opening degree sensor 12 detects an accelerator pedal stepping amount, that is, an accelerator opening degree. The ECU 20 calculates a request torque based on the signal output from the accelerator opening degree sensor 12. That is, the accelerator opening degree sensor 12 is used as a request torque detection sensor detecting a request torque for the engine. Further, the ECU 20 calculates a rotation speed of the engine based on the signal output from the crank angle sensor. The actuator control block B202 executed by the CPU 20e of the ECU 20 optimally calculates major operation amounts of the engine including an air flow amount, a fuel injection amount, an ignition timing, a fuel pressure, and an intake air temperature control device based on the engine operation state obtained from the output of various sensors described above.

The fuel injection amount calculated by the actuator control block B202 executed by the CPU 20e of the ECU 20 is converted into a valve opening pulse signal and is transmitted to the injector 13. Further, an ignition signal is transmitted to the ignition plug 16 so that an ignition is performed at an ignition timing calculated by the actuator control block B202 executed by the CPU 20e of the ECU 20. Further, a throttle opening degree calculated by the ECU 20 is transmitted to the electronic control throttle 2 as a throttle drive signal. Further, the throttle drive signal is transmitted to the intake air temperature control device 7 as a signal for operating the actuator of the intake air temperature control device 7 calculated by the ECU 20.

Fuel is injected into air flowing from the intake pipe into the cylinder 14 through the intake valve to form an air-fuel mixture. The air-fuel mixture is exploded by a spark generated from the ignition plug 16 at a predetermined ignition timing and the piston is pressed down by a combustion pressure thereof so that a driving force of the engine is obtained. Further, the exhaust gas after explosion is carried to the three-way catalyst 10 through the exhaust pipe 15 and an exhaust element is purified inside the three-way catalyst 10 and is discharged to the outside.

A detailed configuration of the intake air temperature control device 7 illustrated in FIG. 3 will be described. As a configuration of the intake air temperature control device 7, a configuration (an intercooler) for exchanging heat with the cooling water circulated in the engine is provided. When the amount of the cooling water flowing in the intercooler is controlled, a heat exchange amount between the cooling water and the gas passing through the intake air temperature control device 7 is controlled so that a temperature of a gas flowing in intake air is controlled. When the temperature of the cooling water is lower than the gas temperature at the inlet of the intake air temperature control device 7, the intake air temperature control unit 20f of the ECU 20 changes an opening degree of a valve (not illustrated) controlling the flow rate of the cooling water and provided in the intake air temperature control device 7, so that the heat exchange amount between the intake gas and the cooling water increases and the intake gas temperature decreases. When a temperature decrease amount increases, the intake air temperature control unit 20f of the ECU 20 increases the opening degree of the valve controlling the flow rate of the cooling water flowing in the intake air temperature control device 7. When the temperature of the cooling water is higher than the gas temperature at the inlet of the intake air temperature control device 7, the intake air temperature control unit 20f of the ECU 20 changes an opening degree of a valve (not illustrated) controlling a flow rate of the cooling water and provided in the intake air temperature control device 7, so that the heat exchange amount between the intake gas and the cooling water increases and the intake gas temperature increases. When the temperature increase amount increases, the intake air temperature control unit 20f of the ECU 20 increases the opening degree of the valve controlling the amount of the cooling water flowing in the intake air temperature control device 7.

With the above-described configuration, the temperature of the intake gas is controlled. As another configuration of the intake air temperature control device 7, a configuration of controlling the intake gas temperature using a heater converting electric energy into heat energy is known. When the heater is used, a heat generation amount of the heat is controlled by using a device (not illustrated) adjusting the amount of electric power flowing in the heater so that a temperature of a gas flowing in intake air is controlled. When the gas temperature increase amount increases, the amount of the electric power flowing in the intake air temperature control device 7 is increased. Still another configuration is illustrated in FIG. 4.

Figure 4:
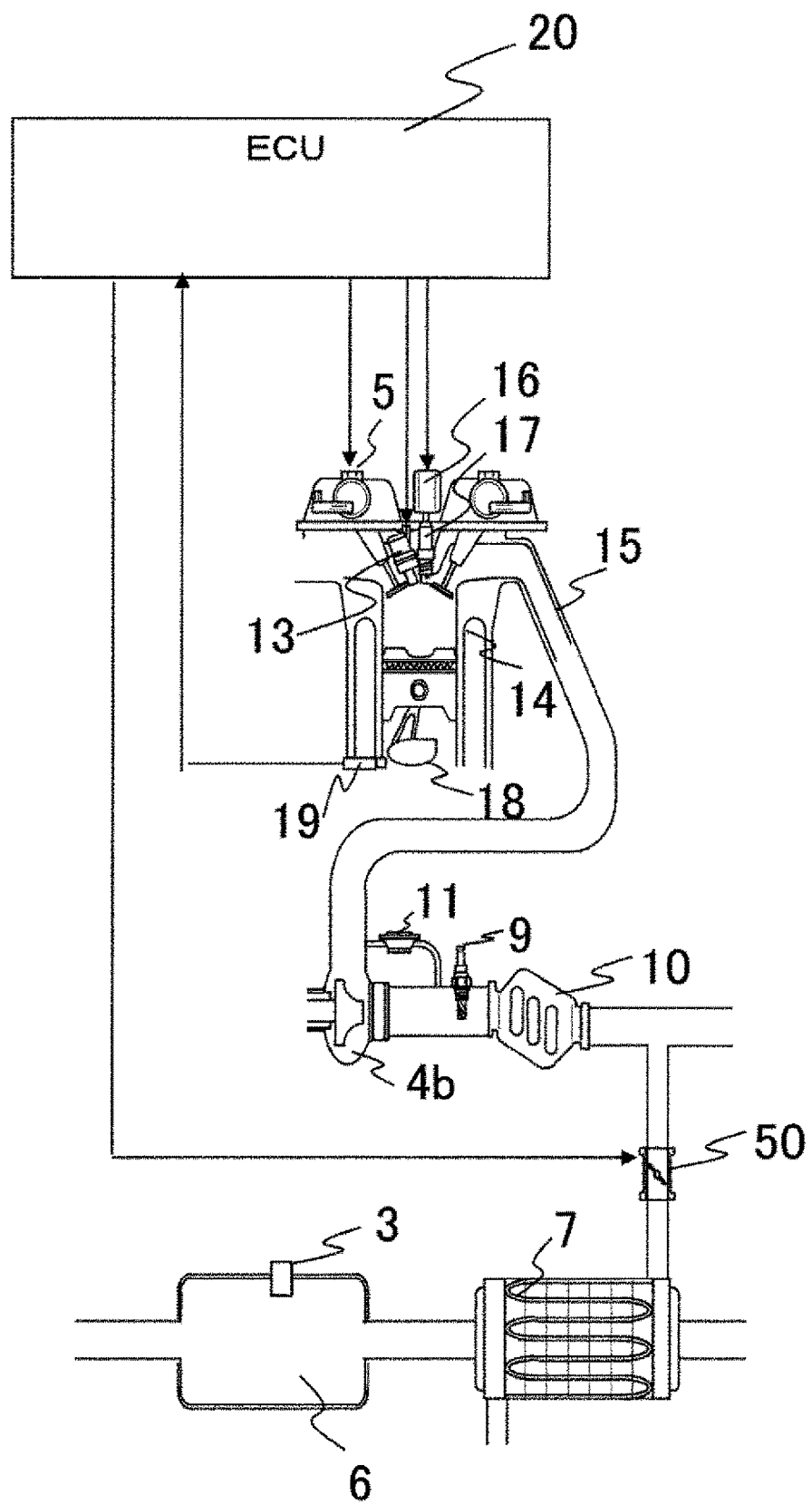
FIG. 4 is a configuration diagram illustrating a different configuration of a heating portion according to the embodiment of the invention.

FIG. 4 is a configuration in which the intake air temperature control device 7 performs a heat exchange between the intake air and the exhaust gas. When the flow rate of the exhaust gas flowing in the intake air temperature control device 7 is controlled, the heat exchange amount between the cooling water and the gas passing through the intake air temperature control device 7 is controlled so that the temperature of the gas flowing into the intake pipe is controlled. For the control of the flow rate of the exhaust gas flowing in the intake air temperature control device 7, a flow rate adjustment valve 50 provided in a pipe connecting the intake air heating device 7 to the exhaust pipe 15 is used. When the intake gas temperature increase amount increases, the intake air temperature control unit 20f of the ECU 20 increases the opening degree of the flow rate adjustment valve 50 so that the flow rate of the exhaust gas flowing in the intake air temperature control device 7 increases and the heat exchange amount with the intake gas increases. Since such an intake air temperature control device 7 is provided, it is possible to realize the intake air temperature necessary for the combustion at the lean combustion limit. As a result, since the lean combustion limit is extended to the condition capable of suppressing the NOx discharge amount, a lean combustion with reduced NOx and fuel consumption can be realized.

Figure 5:
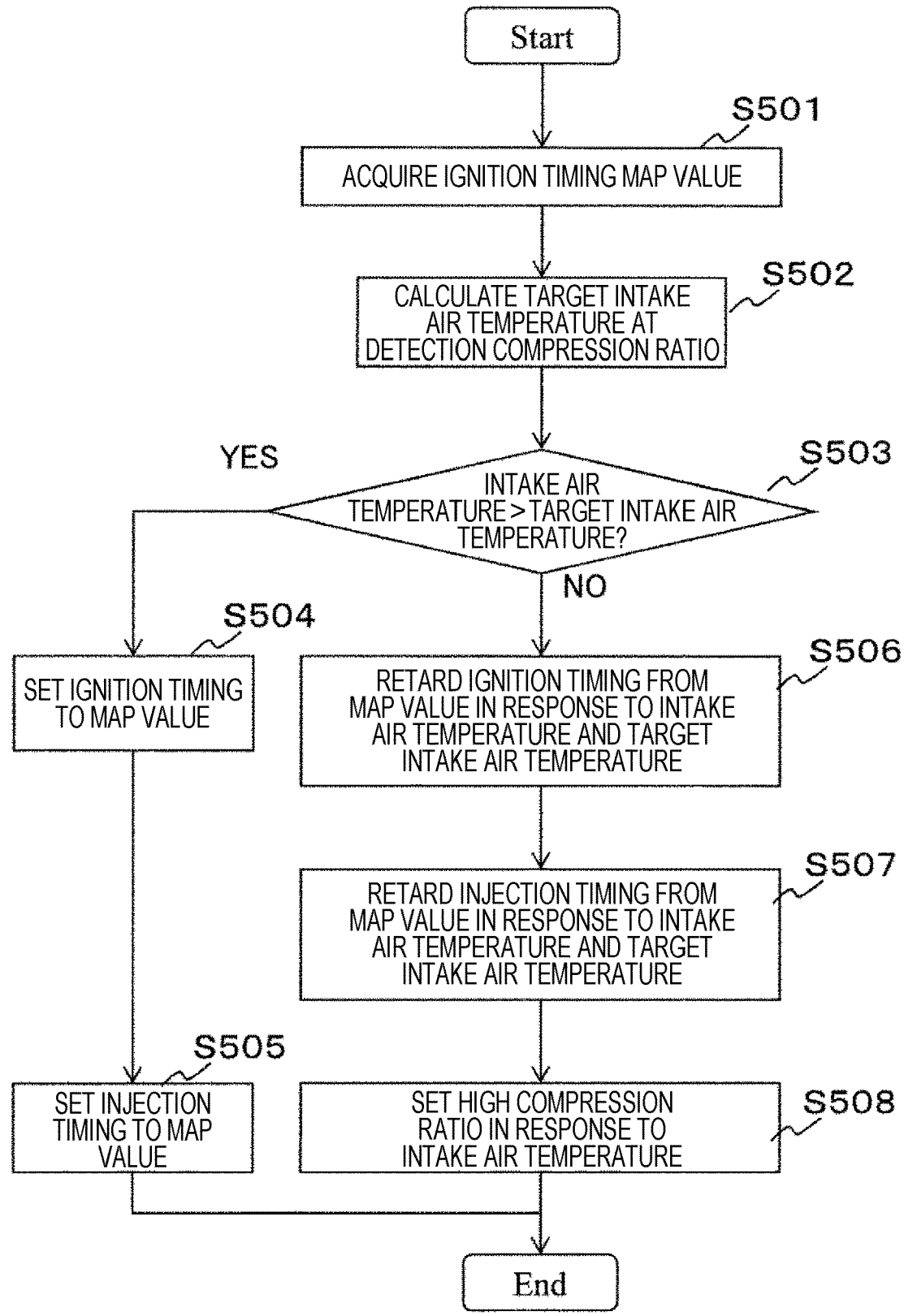
FIG. 5 is a flowchart illustrating control contents of an ignition timing, an injection timing, and a compression ratio in response to an intake air temperature of the engine control device according to the embodiment of the invention.
Figure 9:
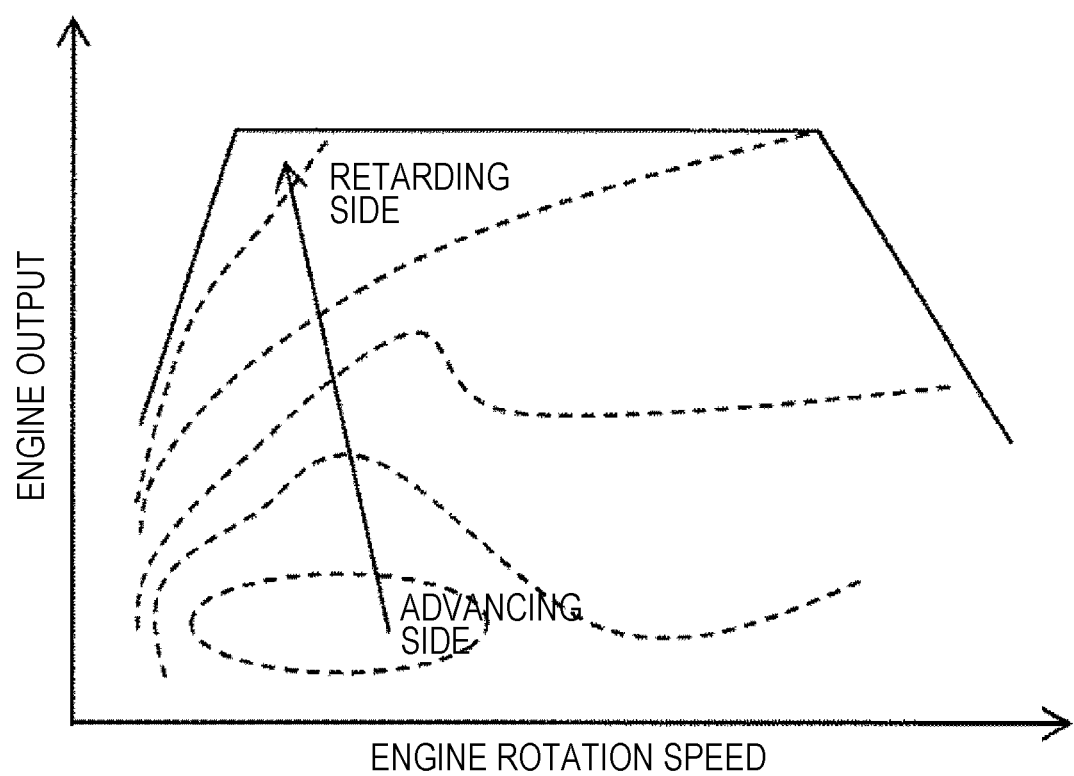
FIG. 9 is a conceptual diagram illustrating injection/ignition timing map values according to the embodiment of the invention.

FIG. 5 illustrates a calculation process executed by the ECU 20 of the embodiment. First, in step S501, an ignition timing map value is acquired. The ignition timing map value indicates a value of an ignition timing set on a map as the function of the engine output and the engine rotation speed or an index relating to them illustrated in FIG. 9. The map value is defined in advance by an engine test or a numerical simulation and is stored as data in the ECU 20. Based on the request torque calculated by the request torque calculation unit and the crank angle sensor 19, the operation point is specified and the map value is searched. Next, in step S502, a target intake air temperature at a detection compression ratio is calculated. The detection of the compression ratio is performed by the variable compression ratio device 18, the variable valve 5, and the ignition timing map value.

In the case of a configuration in which the variable compression ratio device 18 controls the compression ratio by changing the piston top dead center position, the variable compression ratio can be detected as below. A reference state (expressed as 0 with a subscript) is set such that the piston top dead center position is set to the highest position by the variable compression ratio device 18. It is assumed that the machine compression ratio is set as ε1 by the variable compression ratio device 18. At this time, a combustion chamber volume Vc1 at the piston top dead center position is obtained as below when the combustion chamber volume at the compression top dead center in the reference state is indicated by Vc0.

$$Vc1 = \kappa Vc0$$

$$\kappa = (\varepsilon 0 - 1)/(\varepsilon 1 - 1)$$

Further, the actual compression ratio can be expressed as below based on a discharge volume Vst from the intake valve closing timing (IVC: Intake Valve Close) to the ignition timing map value, a discharge volume Vres from the ignition timing map value to the compression top dead center, and the ignition timing.

$$\varepsilon 1, R = (Vc1 + Vst + Vres)/(Vc1 + Vres)$$

For example, a difference between the volume at the compression top dead center and the volume for each crank angle is stored in the ECU 20 as a map (Vr, map (Θ)) of the function of the crank angle and each discharge volume is calculated by using the function. For example, when the intake valve closing timing is indicated by ΘIVC, the ignition timing map value is indicated by ΘADV, map, and the crank angle at the compression top dead center is indicated by ΘTDC, the following equations are obtained.

$$Vst = Vr, map(\Theta IVC) - Vr, map(\Theta ADV, map)$$

$$Vres = Vr, map(\Theta TDC) - Vr, map(\Theta ADV, map)$$

Alternatively, Vr can be expressed as the function of the crank angle Θ (rad) when r indicates the stroke radius, l indicates the length of the connecting rod (the arm connecting the crank arm and the piston), and D indicates the bore diameter.

$$Vr(\Theta) = 0.25\pi D^2 (r \cos \Theta + (l^2 - (r \sin \Theta)^2)^{0.5})$$

Even when the above-described equation is used, the discharge volume can be calculated similarly to the case of using the volume difference map.

Figure 10:
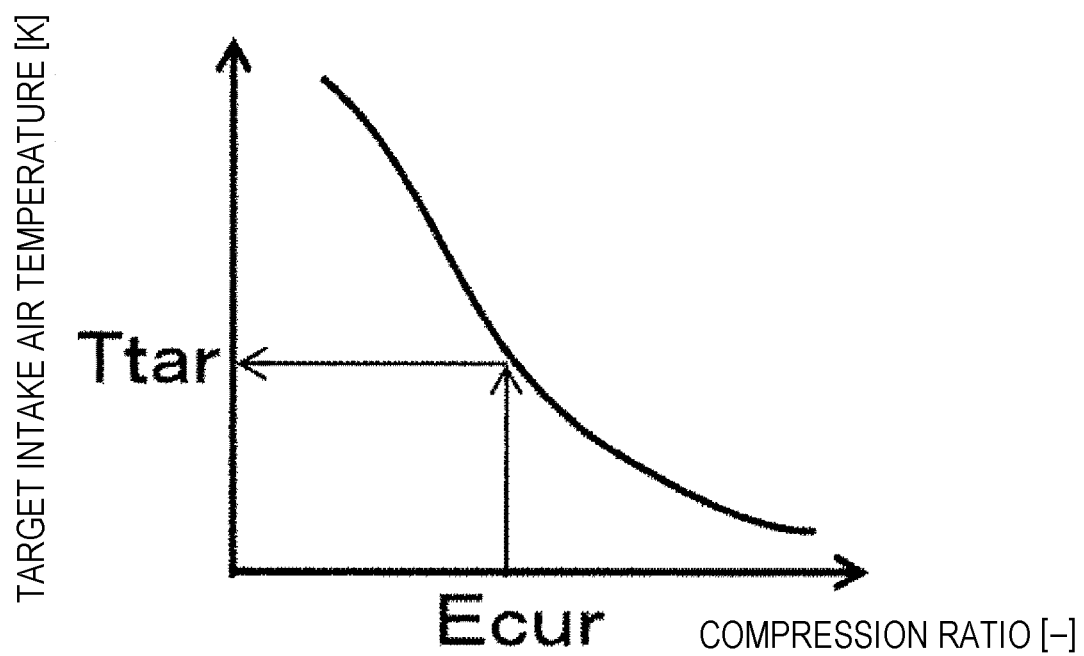
FIG. 10 is a conceptual diagram illustrating a method of determining a target intake air temperature based on a compression ratio according to the embodiment of the invention.

Based on a relation characteristic having a negative correlation between the compression ratio and the target intake air temperature and illustrated in FIG. 10 and the detection compression ratio ε1, R, the target intake air temperature Ttar is calculated. Here, the relation characteristic having a negative correlation between the compression ratio and the target intake air temperature and illustrated in FIG. 10 is set in advance by an engine test or a numerical simulation and is stored as data in the ECU 20. By using a relation characteristic having a negative correlation between the compression ratio and the target intake air temperature and illustrated in FIG. 10, an appropriate intake air temperature setting is selected in response to the compression ratio. In this way, in the embodiment, the target intake air temperature is set in response to the compression ratio and the intake air temperature control unit 20f of the ECU 20 controls the intake side air temperature to become the target intake air temperature.

That is, the intake air temperature control unit 20f of the ECU 20 of the embodiment serves as a temperature control unit which controls the intake side air temperature of the internal combustion engine in response to the compression ratio of the combustion chamber 21. That is, when the intake air temperature control device 7 is the intercooler illustrated in FIG. 3, the intake air temperature control unit 20f controls the amount of the cooling water flowing in the intercooler in response to the compression ratio of the combustion chamber 21 to control the intake side air temperature of the internal combustion engine. Further, when the intake air temperature control device 7 exchanges heat with the exhaust gas as illustrated in FIG. 4, the intake air temperature control unit 20f controls the flow rate of the exhaust gas flowing in the intake air temperature control device 7 in response to the compression ratio of the combustion chamber 21 to control the intake side air temperature of the internal combustion engine.

Accordingly, since it is possible to prevent an excessive increase in intake air temperature, it is possible to set an appropriate intake air temperature. As a result, since it is possible to realize optimal lean combustion while reducing abnormal combustion and cooling loss greatly changed by the temperature after the compression, it is possible to realize stable combustion in the vicinity of the lean combustion limit. Further, when the ignition timing and the injection timing are determined by external factors other than those described in the embodiment and cannot be changed, it is possible to correct the target intake air temperature Ttar determined based on the relation characteristic having a negative correlation between the compression ratio and the target intake air temperature and illustrated in FIG. 10 and the detection compression ratio ε1, R in step S502 in response to the injection timing and the ignition timing. For example, when the injection timing determined by the external factor is indicated by Θinj, e and the ignition timing is indicated by ΘADV, e, a determination can be made from small values of Te, inj and Te, ADV in the following equations.

$$Te, inj = Ttar + A(T0 - Ttar)$$

$$A = (\Theta inj, e - \Theta inj, map)/(\Theta inj, e - \Theta inj, map)$$

$$Te, ADV = B^{(\gamma - 1)} Ttar$$

$$B = (Vc1 + Vr(\Theta ADV, e))/(Vc1 + Vr(\Theta ADV, map))$$

The intake air temperature control unit 20f of the ECU 20 of the embodiment serves as a temperature control unit which controls the intake side air temperature of the internal combustion engine in response to the injection timing and the ignition timing of the combustion chamber 21. That is, when the intake air temperature control device 7 is the intercooler illustrated in FIG. 3, the intake air temperature control unit 20f controls the amount of the cooling water flowing in the intercooler in response to the compression ratio of the combustion chamber 21 to control the intake side air temperature of the internal combustion engine. Further, when the intake air temperature control device 7 exchanges heat with the exhaust gas as illustrated in FIG. 4, the intake air temperature control unit 20f controls the flow rate of the exhaust gas flowing in the intake air temperature control device 7 in response to the compression ratio of the combustion chamber 21 to control the intake side air temperature of the internal combustion engine.

Accordingly, even when the target values of the injection timing, the ignition timing, and the compression ratio cannot be changed, the target intake air temperature can be appropriately controlled. Thus, even when the setting ranges of the injection timing and the ignition timing are limited, stable combustion can be realized.

Next, the routine proceeds to step S503 so that the intake air temperature detected by the intake air temperature sensor 3 is compared with the target intake air temperature. When the intake air temperature detected by the intake air temperature sensor 3 is high, the routine proceeds to step S504 so that the ignition timing is set to the map value. Next, the routine proceeds to step S505 so that the injection timing is set to the map value. The injection timing map value also indicates the value of the injection timing set on the map as the function of the engine output and the engine rotation speed or the index relating to them illustrated in FIG. 9 similarly to the ignition timing. The injection timing map value is defined in advance by an engine test or a numerical simulation and is stored as data in the ECU 20. When the intake air temperature is smaller than the target intake air temperature by the process in step S503, the routine proceeds to step S506. In step S506, the ignition timing setting process of retarding the ignition timing from the map value in response to the intake air temperature and the target intake air temperature is performed. Subsequently, the routine proceeds to step S507 so that the injection timing setting process of regarding the injection timing from the map value in response to the intake air temperature and the target intake air temperature is performed. Next, in step S508, the high compression ratio setting process is performed in response to the intake air temperature and the target intake air temperature. By the above-described process, the ignition timing, the injection timing, and the compression ratio are set and the actuator operation target value is set in response to a difference between the intake air temperature and the target intake air temperature.

Figure 6:
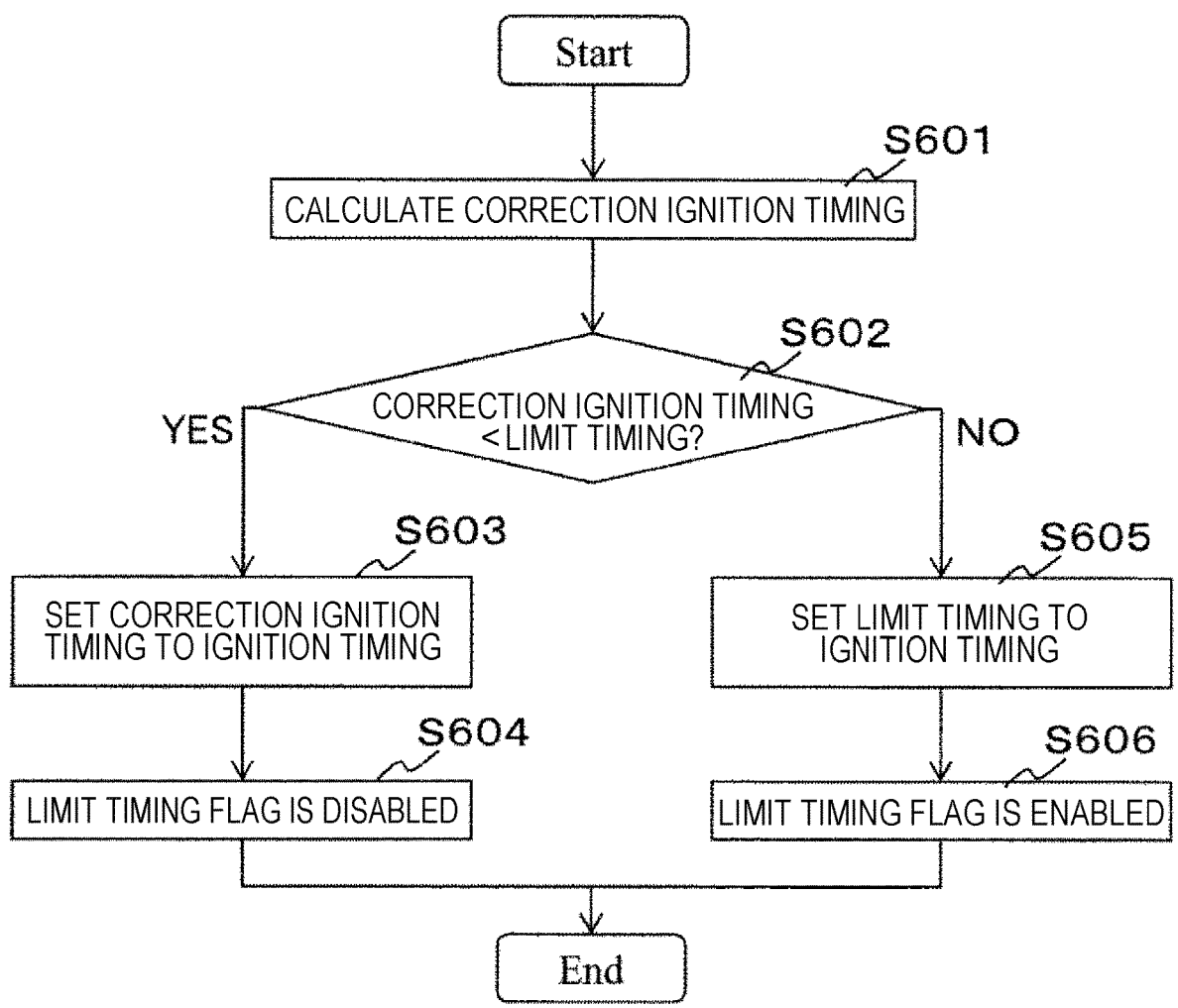
FIG. 6 is a flowchart illustrating control contents of an ignition timing retardation control in response to an intake air temperature of the engine control device according to the embodiment of the invention.

FIG. 6 illustrates a calculation process executed in step S506 of FIG. 5. First, in step S601, the correction ignition timing is calculated. The correction ignition timing is calculated as below. A compression volume which can be obtained at the same temperature as the target intake air temperature Ttar is indicated by Vi.

$$Vi = Vr(\Theta ADV, map)(Ttar/Tin)^{(1/\gamma - 1)}.$$

γ indicates a specific heat ratio and is set from approximately 1.33 to 1.4. A crank angle realizing the compression volume is obtained by solving the equation of $Vi = Vc1 + Vr(\Theta)$ or searching for Vr, map(Θ) satisfying the equation of $Vi = Vc1 + Vr$, map(Θ) or having a minimum difference between the left and right sides.

The crank angle Θ satisfying the compression volume Vi obtained by the search result is set as the correction ignition timing ΘADV, mod. Here, when the compression volume Vi cannot be realized even at the limit angle (ΘADV, limit), the correction ignition timing is set to the limit angle. The limit angle is a value which is set in advance by a test or a simulation and is set to the vicinity of the piston top dead center. Next, the routine proceeds to step S602 to determine whether the correction ignition timing is smaller than the limit timing (at the advancing side). The limit timing indicates the setting when the ignition timing is maximally late and this limit timing is also stored in the ECU 20 as the function of the engine output and the engine rotation speed or the index relating to them illustrated in FIG. 9 similarly to the ignition timing. The limit timing is set before the top dead center. Regarding the map value, when the correction ignition timing is located at the advancing side compared to the limit timing, the routine proceeds to step S603 so that the correction ignition timing is set to the ignition timing. Further, the routine proceeds to step S604 to disable a limit timing flag indicating whether the set ignition timing is the limit timing. When it is determined that the correction ignition timing is larger than the limit timing (at the retarding side) in step S602, the routine proceeds to step S605 so that the limit timing is set as the ignition timing. Next, the routine proceeds to step S606 so that the limit timing flag is enabled.

If the ignition timing is set in this way, the ignition timing can be set to a late timing when the intake air temperature is lower than the target intake air temperature. Since the ignition timing is set lately, the temperature at the ignition timing can be increased compared to a case where the ignition is performed at the ignition timing map value.

That is, the ECU 20 of the embodiment includes the ignition timing control unit (the actuator control unit 20g) which controls the ignition device so that the ignition timing of the ignition device becomes later than the "ignition timing set when the intake side air temperature is equal to or higher than the target intake air temperature at the compression ratio of the combustion chamber 21" if the target intake air temperature is set to have a negative correlation with respect to the compression ratio of the combustion chamber 21 and the intake side air temperature of the internal combustion engine is lower than the target intake air temperature at the compression ratio of the combustion chamber 21.

With such a configuration, since the temperature after compression can be controlled to become the same temperature regardless of the compression ratio, it is possible to obtain the same combustion state regardless of the compression ratio without increasing the cooling loss due to the excessive overheating. Further, since it is possible to ensure the temperature at the ignition timing when the intake air temperature is low, it is possible to perform stable combustion in the vicinity of the lean combustion limit. As a result, even in a lean air-fuel mixture which cannot be burned at the time of the ignition with the ignition map value, it is possible to approach stable combustion by starting combustion in a condition in which the temperature is high due to the late ignition timing.

Further, when the ignition timing is set based on the compression volume Vi obtained at the same temperature as described above, it is possible to set the ignition timing retardation amount in response to a difference between the intake air temperature and the target intake air temperature. As a result, it is possible to further retard the ignition timing in a condition in which the intake air temperature is lower than the target intake air temperature.

That is, the ECU 20 of the embodiment includes the ignition timing control unit (the actuator control unit 20g) which controls the ignition device to increase the retardation amount of the ignition timing of the ignition device as a difference between the intake side air temperature and the target intake air temperature at the compression ratio of the combustion chamber 21 increases when the intake side air temperature of the internal combustion engine is lower than the target intake air temperature at the compression ratio of the combustion chamber 21.

As a result, since it is possible to determine the ignition timing retardation amount in response to the intake air temperature state even in the lean air-fuel mixture which cannot be burned at the time of the ignition with the ignition map value, it is possible to realize stable combustion in a wider intake air temperature condition.

Figure 7:
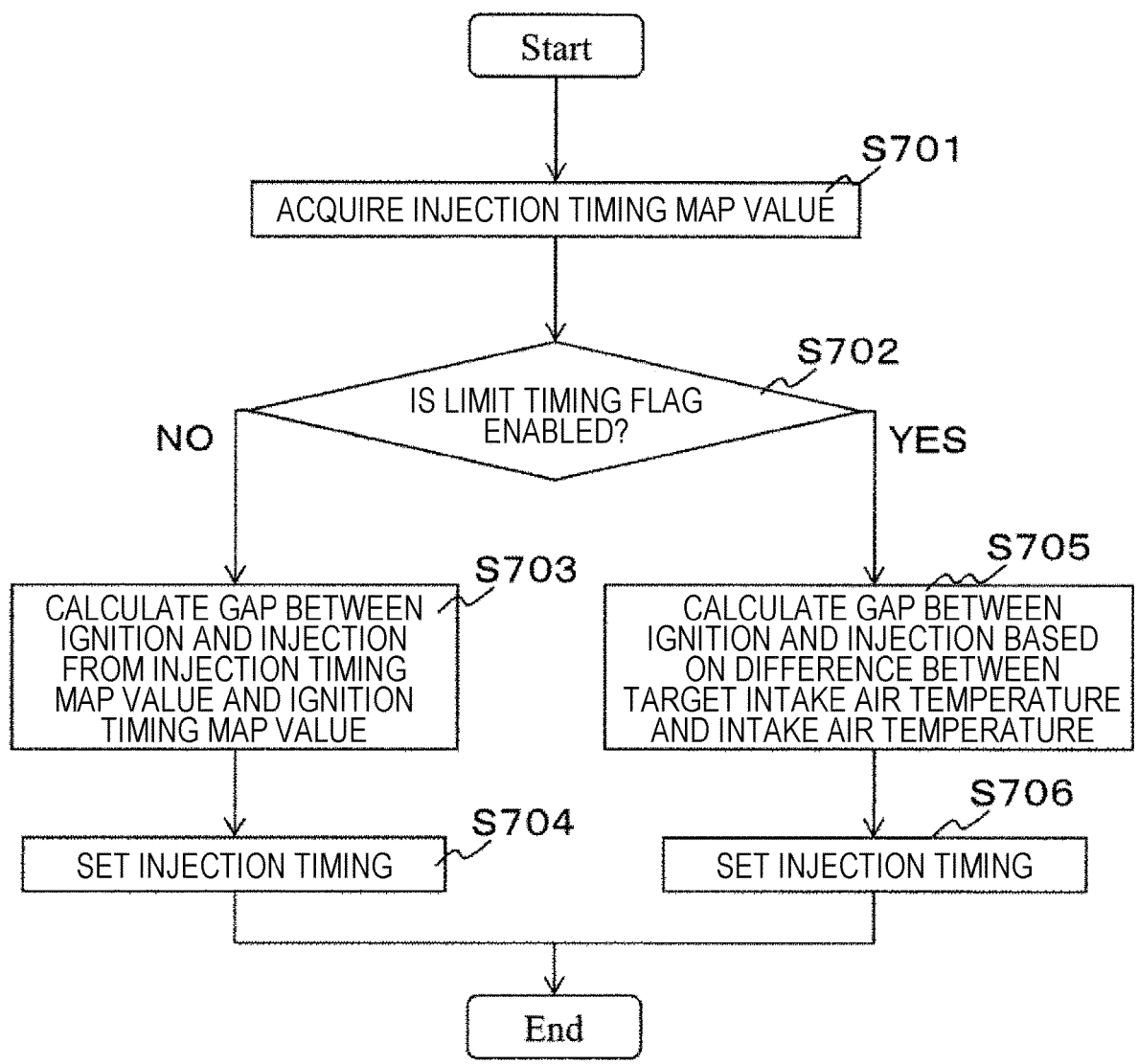
FIG. 7 is a flowchart illustrating control contents of an injection timing retardation control in response to an intake air temperature of the engine control device according to the embodiment of the invention.

FIG. 7 illustrates a calculation process executed in step S507 of FIG. 5. First, in step S701, the injection timing map value is acquired from the map stored in the ECU 20 as the function of the engine output and the engine rotation speed or the index relating to them illustrated in FIG. 9. Next, the routine proceeds to step S702 to determine whether the limit timing flag indicating whether the ignition timing is set to the limit timing is enabled. In step S702, when the limit timing flag is disabled, the routine proceeds to step S703 so that a gap ($\Delta$Diff, map>0) between the ignition timing and the injection timing ($\Theta$inj, map) is calculated from the following relation in the standard state based on the injection timing map value and the ignition timing map value.

$$\Delta Diff,map=\Theta ADV,map-\Theta inj,map$$

Next, the routine proceeds to step S704 so that the injection timing($\Theta$inj) is set from the following relation.

$$\Theta inj=\Theta ADV,\text{mod}-\Delta Diff,map$$

In step S702, when it is determined that the ignition timing is set to the limit timing, the routine proceeds to step S705 so that a gap between the injection timing and the ignition timing is set based on a difference between the target intake air temperature and the intake air temperature. For example, the gap $\Delta$Diff, mod between the injection timing and the ignition timing can be obtained by the following relation when the minimum value of the gap between the injection timing and the ignition timing is indicated by $\Delta$Diff, min, the target intake air temperature is indicated by Ttar, the intake air temperature is indicated by Tin, and the reference temperature is indicated by T0, and using A and B as a coefficient.

$$\Delta Diff,\text{mod}=\Delta Diff,\text{min}+C(DTin-T0)$$

The reference temperature T0 can be set to, for example, the standard atmosphere temperature (298.15 K). C and D are defined in advance based on an engine test or simulation and are stored in the ECU 20. Alternatively, when the limit angle is indicted by $\Theta$ADV, limit, the following equation can be obtained.

$$C=(\Delta Diff,map-\Delta Diff,\text{min})/(Ttar-T0)$$

$$D=(Vc1+Vr(\Theta ADV,map))^{(\gamma-1)}/(Vc1+Vr(\Theta ADV,\text{limit}))^{(\gamma-1)}$$

Next, the routine proceeds to step S706 so that the injection timing is set as below by using $\Delta$Diff, mod defined in step S705.

$$\Theta inj=ADV\text{mod}-\Delta Diff,\text{mod}$$

With the above-described configuration, the injection timing can be set in response to the intake air temperature and the ignition timing.

In general, there is a tendency that the excess air ratio of the air-fuel mixture around the ignition plug at the ignition timing increases in accordance with an increase in gap between the injection timing and the ignition timing. That is, the temperature increases if only the ignition timing is retarded, but since the excess air ratio of the air-fuel mixture around the ignition plug increases at the same time, it becomes a state where combustion hardly occurs from the viewpoint of the fuel concentration.

When the injection timing is set in this way, the injection timing can be set to the retarding side when the intake air temperature is lower than the target intake air temperature. As a result, it is possible to increase the air-fuel mixture concentration formed around the ignition plug 17 at the ignition timing compared to the case of using the injection map value. That is, when the intake air temperature is low, the fuel concentration of the air-fuel mixture formed around the ignition plug at the ignition timing can be set to be slightly higher than the lean combustion limit and thus stable combustion in the vicinity of the lean combustion limit can be realized.

That is, the injection timing control unit (the actuator control unit 20*g*) of the ECU 20 of the embodiment controls the fuel injection device 13 so that the final injection timing of the fuel injection device 13 before the ignition of the ignition device is retarded compared to the "injection timing set when the intake side air temperature is equal to or higher than the target intake air temperature at the compression ratio of the combustion chamber 21" if the intake side air temperature of the internal combustion engine is lower than the target intake air temperature at the compression ratio of the combustion chamber 21.

As a result, when the air-fuel mixture distribution is controlled by changing the injection control so that the air-fuel mixture higher than the lean combustion limit is distributed around the plug, it is possible to prevent an unstable state caused when the intake air temperature is lower than the target intake air temperature at the time of using the injection map value.

Further, as described above, the injection timing retardation amount can be set in response to a difference between the intake air temperature and the target intake air temperature. As a result, the injection timing can be largely retarded in a condition in which the intake air temperature is lower than the target intake air temperature.

That is, the injection timing control unit (the actuator control unit 20*g*) of the ECU 20 of the embodiment includes the injection timing control unit which controls the fuel injection device to increase the retardation amount of the injection timing as a difference between the target intake air temperature and the intake side air temperature increases when the intake side air temperature is lower than the target intake air temperature at the compression ratio of the combustion chamber 21.

As a result, since it is possible to determine the injection timing retardation amount in response to the intake air temperature state even in the lean air-fuel mixture which cannot be burned when the ignition is performed with the ignition map value or the ignition timing is retarded, it is possible to realize stable combustion by appropriately forming the air-fuel mixture around the ignition plug at the ignition timing in a wider intake air temperature condition.

Further, in this case, it is desirable that the ignition timing control unit (the actuator control unit 20*g*) control the ignition device so that the ignition timing of the ignition device is retarded compared to the "ignition timing set when the intake side air temperature is equal to or higher than the target intake air temperature at the compression ratio of the combustion chamber 21" if the intake side air temperature of the internal combustion engine is lower than the target intake air temperature at the compression ratio of the combustion chamber 21. In the embodiment, since the ignition device control unit retarding the ignition timing is provided together with the injection control unit retarding the injection timing, a desired control can be performed. With such a configuration, since it is possible to ensure the temperature at the ignition timing when the intake air temperature is low and to suppress an excessive decrease in excess air ratio of the air-fuel mixture at the ignition timing, stable combustion at the lean combustion hope can be performed. Since it is possible to keep the excess air ratio of the air-fuel mixture around the ignition plug while increasing the temperature of the air-fuel mixture at the ignition timing when the injection timing is shifted in accordance with the ignition timing (when a gap between the injection and the ignition is kept), stable combustion can be more easily performed. If the temperature is not sufficient even when the ignition timing is retarded to the limit, the injection timing is retarded so that a gap becomes smaller than a gap between the ignition and the injection defined by the ignition timing map and the injection timing map. Accordingly, since the excess air ratio around the ignition plug decreases, combustion can be stabilized.

This is because the combustion speed necessary for the low temperature can be ensured in that the laminar combustion speed becomes higher as the excess air ratio becomes smaller in the range of the excess air ratio of 1 or more. Here, since the NOx discharge amount increases when the excess air ratio around the ignition plug decreases, it is preferable to suppress a decrease in excess air ratio (without decreasing a gap between the injection and the ignition too much) as much as possible. In order to realize stable combustion while suppressing a decrease in excess air ratio, it is desirable to retard the injection timing at the same time as the ignition as in the embodiment. However, the invention is not limited thereto. When the ignition timing is fixed to the ignition map timing, only the fuel injection timing is retarded, and the excess air ratio of the air-fuel mixture around the ignition plug is decreased, stable combustion can be realized.

Further, in the embodiment, a gap between the ignition and the injection is kept uniform when the ignition timing is located at the advancing side compared to the limit timing, but the invention is not limited thereto. For example, the gap may be changed. When the injection timing is shifted to the retarding side, the in-cylinder pressure of the injection timing increases. For this reason, since the arrival distance of the spray is shortened, a change in excess air ratio around the plug with respect to time becomes different.

Figure 8:
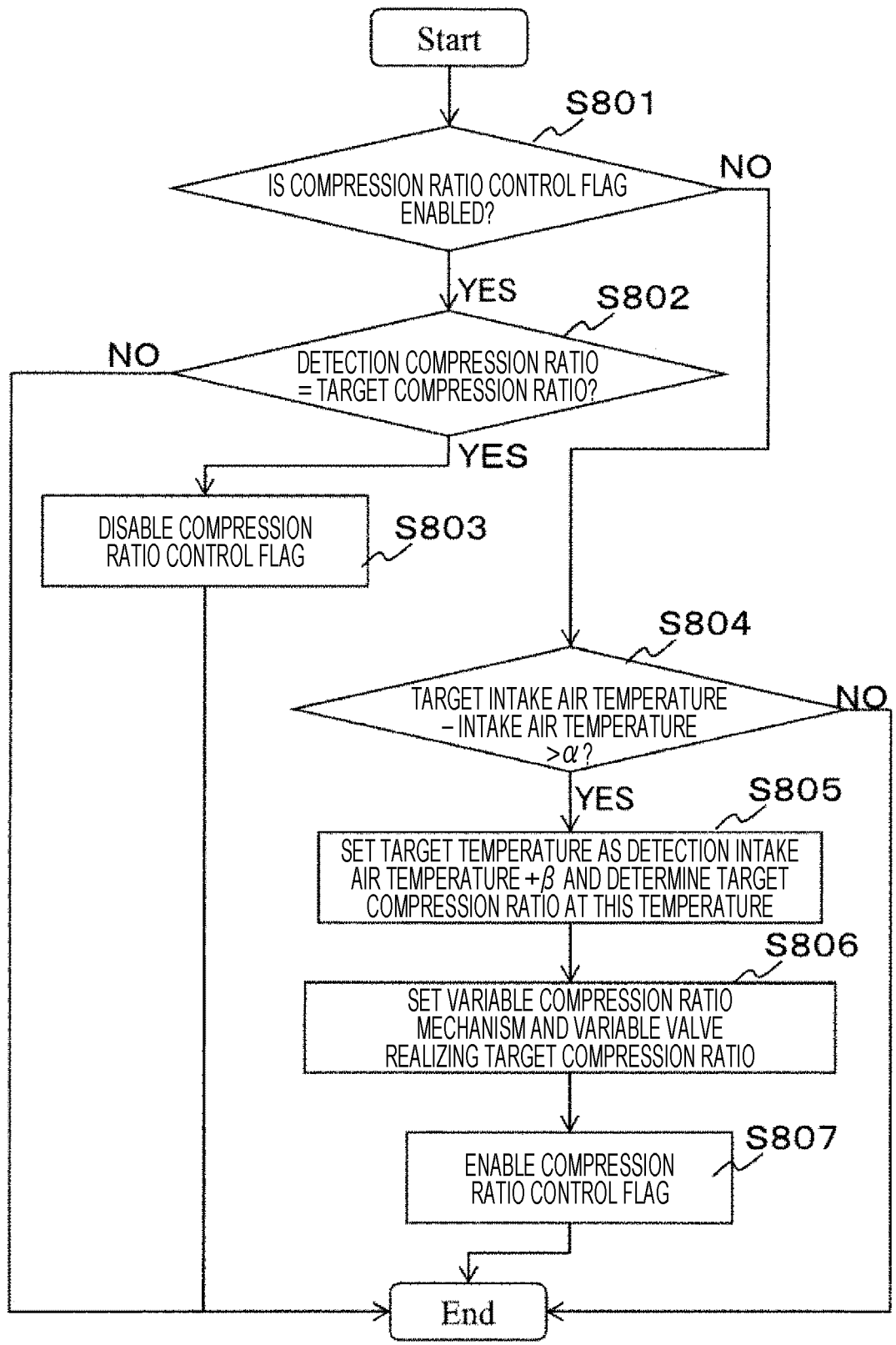
FIG. 8 is a flowchart illustrating control contents of a compression ratio in response to an intake air temperature of the engine control device according to the embodiment of the invention.
Figure 11:
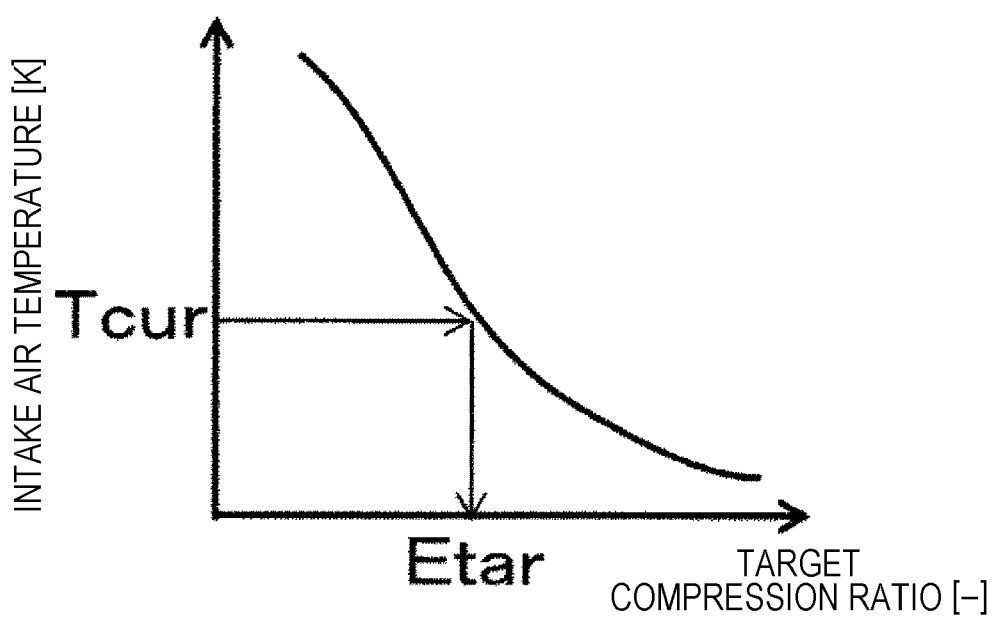
FIG. 11 is a conceptual diagram illustrating a method of determining a target compression ratio based on an intake air temperature according to the embodiment of the invention.

FIG. 8 illustrates a calculation process executed in step S508 of FIG. 5. First, in step S801, it is determined whether a compression ratio control flag indicating whether the compression ratio is controlled is enabled. When the compression ratio control flag is enabled, the routine proceeds to step S802 to determine whether the detection compression ratio is the target compression ratio. At this time, an evaluation is performed by using the actual compression ratio ε1, R. When the compression ratio does not reach the target compression ratio, the routine ends directly and a control is continued toward the target compression ratio. When the compression ratio reaches the target compression ratio, the routine proceeds to step S803 so that the compression ratio control flag is disabled and the compression ratio control is stopped. In step S802, when it is determined that the compression ratio control flag is disabled, the routine proceeds to step S804 to determine whether a difference between the target intake air temperature and the intake air temperature is larger than a reference value α. The reference value α is a positive value and is a reference value for determining that the control of the compression ratio is not performed when the temperature difference is small and the time until the intake air temperature reaches the target intake air temperature is short (the responsiveness of the intake air temperature is fast) and for determining that the control of the compression ratio is performed when the temperature difference is large and it takes time until the intake air temperature reaches the target intake air temperature (the responsiveness of the intake air temperature is slow). Specifically, since the reference value is determined based on the responsiveness of the intake air temperature and the compression ratio, the value is dependent on the configuration of the intake air temperature control device 7. The reference value α is defined in advance by an engine test or a simulation and is stored in the ECU. When a difference between the target intake air temperature and the intake air temperature is larger than the reference value α, the routine proceeds to step S805 to determine the target compression ratio at the detection intake air temperature. A target compression ratio Etar of the detection intake air temperature is determined based on a relation characteristic having a negative correlation between the intake air temperature and the target compression ratio as illustrated in FIG. 11 and the detection intake air temperature Tcur. The value of a relation characteristic having a negative correlation between the intake air temperature and the target compression ratio is defined in advance by an engine test or a simulation and is stored in the ECU.

That is, in the embodiment, the internal combustion engine is provided with the variable compression ratio device 18 which changes the compression ratio and the actuator control unit 20g (the compression ratio control unit) of the ECU 20 controls the variable compression ratio device 18 so that the compression ratio of the combustion chamber 21 increases when the intake side air temperature is lower than the target intake air temperature at the compression ratio of the combustion chamber 21. Compared to the response of the intake air temperature, the response of the variable valve 5 or the variable compression ratio device 18 controlling the compression ratio is fast. If the low-temperature condition is continued for a long time, the excess air ratio around the ignition plug increases when a gap between the injection timing and the ignition timing decreases in the flow illustrated in FIG. 7 and thus a period in which the gap becomes smaller than the gap defined by the map value becomes long. Since the NOx discharge amount increases in the meantime, it is desirable to shorten a gap between the ignition and the injection as much as possible. When the compression ratio is operated to fasten a timing in which a temperature after compression reaches an appropriate temperature range, it is possible to reduce the degradation amount of the low Nox performance by shortening a period in which a gap between the injection timing and the ignition timing becomes shorter than a value defined by the map value.

Regarding the detection of the intake air temperature, the intake air temperature can be detected by the temperature detected by the air flow sensor 1 and a pressure detected by the replaced pressure sensor by replacing the intake air temperature sensor 3 illustrated in FIG. 3 by the intake pressure sensor.

Figure 12:
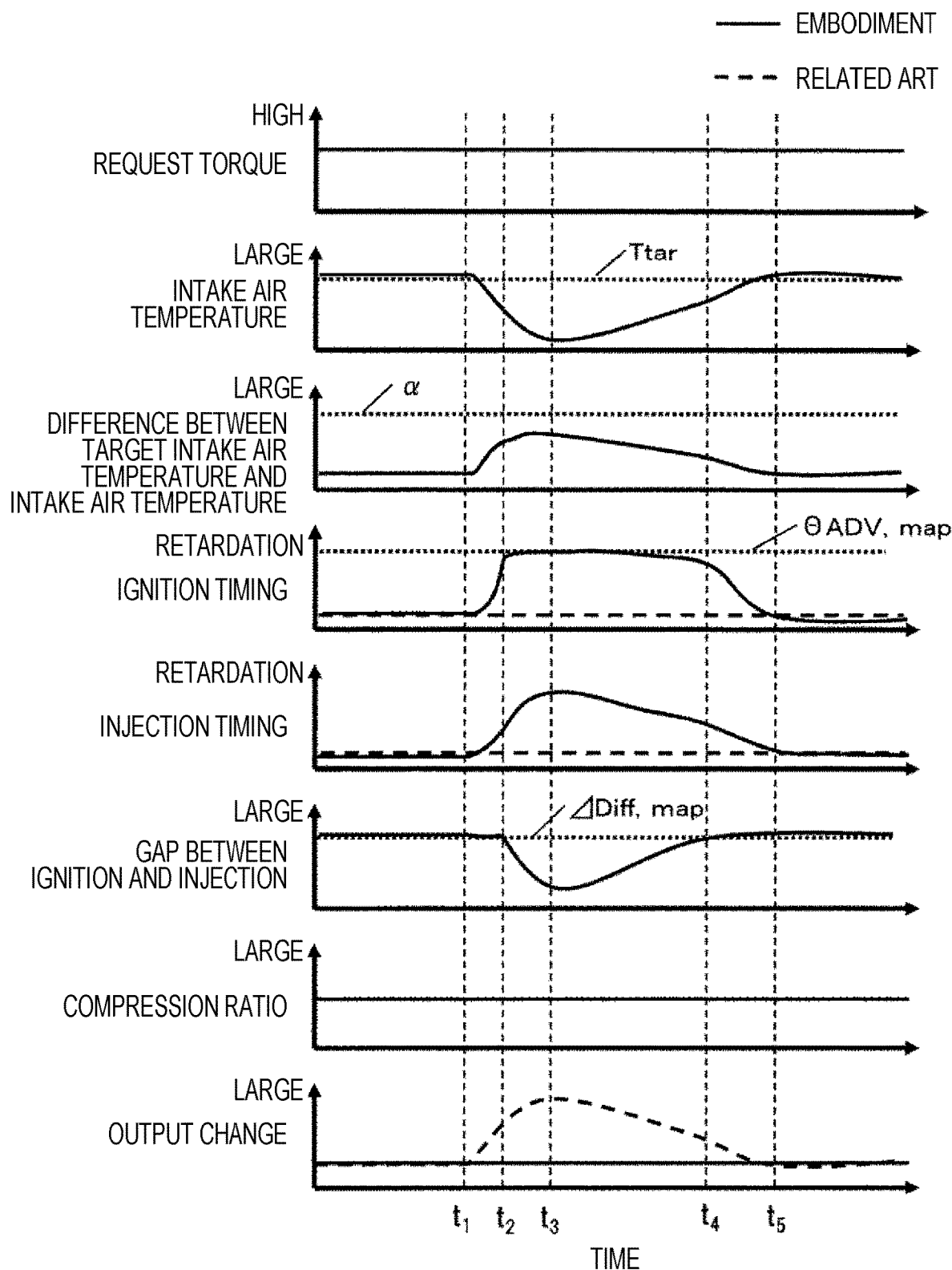
FIG. 12 is a conceptual diagram illustrating various operation changes at the time of controlling an ignition timing and an injection timing based on an intake air temperature according to the embodiment of the invention.

FIG. 12 illustrates a change in the ignition timing, the injection timing, and the compression ratio at the time of using the flowcharts illustrated in FIGS. 5 to 8. The intake air temperature changes at the time t1. Then, a state where the intake air temperature is returned to the target intake air temperature is assumed by the control of the intake air temperature. Thus, in FIG. 12, a difference between the target intake air temperature and the intake air temperature does not exceed the reference value α. When the temperature decreases at the time t1, the ignition timing is retarded and the injection timing is also retarded accordingly. Here, since the ignition timing retardation amount increases to reach the limit timing at the time t2, the injection timing is retarded to fill the gap with respect to the injection timing. When the heating is performed by the intake air temperature control device so that the intake air temperature increases at the time t3, the injection timing starts to be advanced. Then, when the gap of the injection timing exceeds a predetermined amount, the ignition timing also starts to be retarded. Here, the predetermined amount can be set to, for example, a gap between the ignition and the injection obtained by the injection map value and the ignition map value.

With the above-described control, combustion at the lean combustion limit can be made even when the intake air temperature changes without deteriorating the combustion stability. In the related art, since the retardation correction of the injection timing and the ignition timing is not performed regardless of the intake air temperature, combustion in the vicinity of the lean combustion limit becomes unstable in accordance with the intake air temperature so that a change in output increases.

Figure 13:
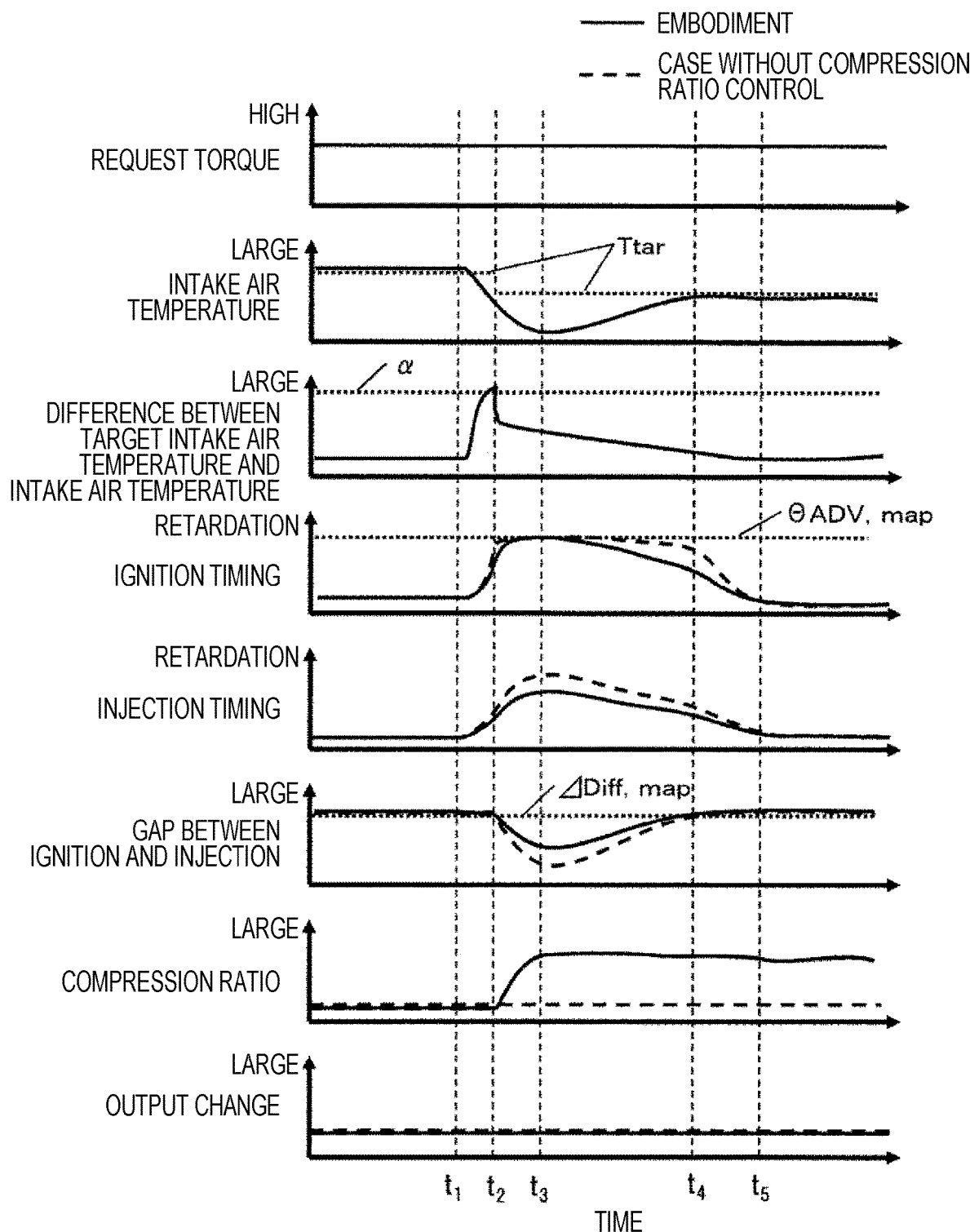
FIG. 13 is a conceptual diagram illustrating various operation changes at the time of controlling an ignition timing, an injection timing, and a compression ratio based on an intake air temperature according to the embodiment of the invention.

FIG. 13 illustrates a change in the ignition timing, the injection timing, and the compression ratio at the time of using flowcharts illustrated in FIGS. 5 to 8. When the intake air temperature changes at the time t1 so that a difference between the target intake air temperature and the intake air temperature exceeds the reference value α, the compression ratio is controlled. When the temperature decreases at the time t1, the ignition timing is retarded and the injection timing is also retarded accordingly. Here, when a difference between the target intake air temperature and the intake air temperature exceeds the reference value α at the time t2, a control of changing the compression ratio to the high compression ratio is performed. At this time, the target value of the intake air temperature is corrected. Since the ignition timing retardation amount increases to reach the limit timing, the retardation of the injection timing is performed to fill the gap with respect to the injection timing. When the heating is performed by the intake air temperature control device so that the intake air temperature increases at the time t3, the injection timing starts to be advanced. When the gap of the injection timing exceeds a predetermined amount, the ignition timing starts to be retarded. Here, the predetermined amount can be set to, for example, a gap between the ignition and the injection obtained by the injection map value and the ignition map value.

With the above-described control, combustion at the lean combustion limit can be performed even when the intake air temperature changes without deteriorating the combustion stability. When the high compression ratio is not performed, a period in which the ignition timing is set to the limit timing increases and a period in which a gap between the injection timing and the ignition timing becomes smaller than ΔDiff, map increases. In a condition in which the gap is smaller than ΔDiff, map, the ratio of the air-fuel mixture increases compared to the lean combustion limit and thus the discharge amount of NOx (nitrogen oxides) increases. When the compression ratio is set to the high compression ratio, an increase in temperature due to compression is high. Accordingly, it is possible to ensure a temperature necessary for the ignition timing at an early stage. As a result, since the ignition retardation period for ensuring a temperature can be shortened, it is possible to shorten a period in which a gap between the injection and the ignition becomes smaller than ΔDiff, map and thus to suppress the NOx discharge amount.

In the above description, as the intake air temperature heating means, an intake air cooling amount control using the intercooler 7 and a heat exchange between the exhaust gas and the intake air have been disclosed, but the invention is not limited to these means. For example, a control disclosed in the embodiment can be applied to a heater for heating the intake air or a compressor for overheating the intake air.

REFERENCE SIGNS LIST 1 air flow sensor
2 electronic control throttle
3 intake air temperature sensor
4 supercharger
4a compressor
4b turbine
5 variable valve
6 intake manifold
7 intake air temperature control device
9 air-fuel ratio sensor
10 three-way catalyst
11 waste gate valve
12 accelerator opening degree sensor
13 in-cylinder direct injection injector
14 cylinder
15 exhaust pipe
16 ignition coil
17 ignition plug
18 variable compression ratio device
19 crank angle sensor
20 ECU
20a input circuit
20b input/output port
20c RAM
20d ROM
20e CPU
20f electronic control throttle drive circuit
20g injector drive circuit
20h waste gate valve drive circuit
20j intercooler cooling water valve drive circuit
20k transmission drive circuit
20m EGR valve drive circuit
40 EGR pipe
41 EGR valve
42 EGR cooler
43 differential pressure sensor
44 EGR temperature sensor
100 engine

The invention claimed is:

1. An internal combustion engine control device comprising:
a controller which controls an internal combustion engine provided with a fuel injection device directly injecting fuel into a combustion chamber and an ignition device igniting an air-fuel mixture formed inside the combustion chamber and in which a target intake air temperature is set to have a negative correlation with respect to a compression ratio of the combustion chamber, wherein the controller is configured to:
control the fuel injection device so that a final injection timing of the fuel injection device before the ignition of the ignition device is retarded compared to an injection timing set when an intake side air temperature is equal to or higher than the target intake air temperature at the compression ratio of the combustion chamber if the intake side air temperature of the internal combustion engine is lower than the target intake air temperature at the compression ratio of the combustion chamber, and control the ignition device so that an ignition timing of the ignition device is retarded compared to an ignition timing set when the intake side air temperature is equal to or higher than the target intake air temperature at the compression ratio of the combustion chamber if the intake side air temperature of the internal combustion engine is lower than the target intake air temperature at the compression ratio of the combustion chamber.

2. The internal combustion engine control device according to claim 1, wherein the controller increases a retardation amount of the injection timing as a difference between the target intake air temperature and the intake side air temperature increases if the intake side air temperature is lower than the target intake air temperature at the compression ratio of the combustion chamber.

3. The internal combustion engine control device according to claim 1, wherein the controller increases a retardation amount of the ignition timing as a difference between the target intake air temperature and the intake side air temperature increases if the intake side air temperature is lower than the target intake air temperature at the compression ratio of the combustion chamber.

4. The internal combustion engine control device according to claim 1, wherein the controller increases a retardation amount of the injection timing as a difference between the target intake air temperature and the intake side air temperature increases if the intake side air temperature is lower than the target intake air temperature at the compression ratio of the combustion chamber.

* * * * *